(12) United States Patent
Rubie et al.

(10) Patent No.: US 11,383,245 B2
(45) Date of Patent: Jul. 12, 2022

(54) MILL LINER INSTALLATION

(71) Applicant: Russell Mineral Equipment Pty Ltd, Toowoomba (AU)

(72) Inventors: Peter John Rubie, Toowoomba (AU); Andrew Ross Chapman, Hodgson Vale (AU)

(73) Assignee: Russell Mineral Equipment Pty Ltd., Toowoomba (AU)

( * ) Notice: Subject to any disclaimer, the term of this patent is extended or adjusted under 35 U.S.C. 154(b) by 352 days.

(21) Appl. No.: 16/471,426

(22) PCT Filed: Dec. 19, 2017

(86) PCT No.: PCT/AU2017/051417
§ 371 (c)(1),
(2) Date: Jun. 20, 2019

(87) PCT Pub. No.: WO2018/112524
PCT Pub. Date: Jun. 28, 2018

(65) Prior Publication Data
US 2021/0129155 A1 May 6, 2021

(30) Foreign Application Priority Data
Dec. 19, 2016 (AU) ................... 2016905248

(51) Int. Cl.
*B25B 29/02* (2006.01)
*B02C 19/00* (2006.01)
(Continued)

(52) U.S. Cl.
CPC .............. *B02C 19/00* (2013.01); *B25B 29/02* (2013.01); *F16B 23/0061* (2013.01);
(Continued)

(58) Field of Classification Search
CPC ......... B25B 29/02; B25B 23/10; B25B 23/12; B02C 2210/02; B02C 19/00; F16B 23/0061; F16B 23/0084; F16B 23/0092
See application file for complete search history.

(56) References Cited

U.S. PATENT DOCUMENTS 3,802,150 A * 4/1974 Melton ................... B02C 17/22
52/749
3,804,346 A * 4/1974 Norman ................ B02C 17/225
241/300

(Continued)

FOREIGN PATENT DOCUMENTS

CN 204747937 U * 11/2015
CN 204747937 U 11/2015
(Continued)

OTHER PUBLICATIONS

International Search Report dated Jul. 16, 2018 in PCT/AU2018/050169.

*Primary Examiner* — Bayan Salone
(74) *Attorney, Agent, or Firm* — McCarter & English, LLP

(57) ABSTRACT

The present disclosure relates to a method for use in installation of a mill liner, the method including (a) retaining a mounting bolt at least partially within a liner opening extending through the mill liner, (b) positioning the mill liner against a mill shell so that the retained mounting bolt is aligned with a mill shell opening extending through the mill shell, (c) selectively coupling an extraction tool to the mounting bolt, the coupling performed by an operator outside of the mill shell, (d) detaching the mounting bolt from the liner using the extraction tool; (e) pulling the mounting bolt through the mill shell opening so that at least a portion of the mounting bolt protrudes outside of the mill shell, and, (e) securing a fastener onto the mounting bolt to thereby attach the mill liner to the mill.

46 Claims, 15 Drawing Sheets

(51) Int. Cl.
   *B25B 23/10*   (2006.01)
   *B25B 23/12*   (2006.01)
   *F16B 23/00*   (2006.01)

(52) U.S. Cl.
   CPC ...... *F16B 23/0084* (2013.01); *F16B 23/0092* (2013.01); *B02C 2210/02* (2013.01); *B25B 23/10* (2013.01); *B25B 23/12* (2013.01); *Y10T 29/49948* (2015.01)

(56) References Cited

U.S. PATENT DOCUMENTS

| | | | |
|---|---|---|---|
| 5,752,665 A * | 5/1998 | Wason | B02C 17/225 |
| | | | 241/300 |
| 11,167,289 B2 * | 11/2021 | Waters | B02C 13/282 |
| 2012/0180364 A1 | 7/2012 | Mepham et al. | |
| 2013/0299617 A1 * | 11/2013 | Watt | B02C 17/225 |
| | | | 294/81.62 |

FOREIGN PATENT DOCUMENTS

| | | | | |
|---|---|---|---|---|
| WO | WO 1997/026116 A1 | 7/1997 | | |
| WO | WO-9726116 A1 * | 7/1997 | ............... | B25D 9/12 |
| WO | WO 2001/028688 A1 | 4/2001 | | |
| WO | WO-0128688 A1 * | 4/2001 | ............ | B02C 2/005 |
| WO | WO 2012/079123 A2 | 6/2012 | | |
| WO | WO-2012079123 A2 * | 6/2012 | ......... | B02C 17/1825 |
| WO | WO 2013/090984 A1 | 6/2013 | | |
| WO | WO-2013090984 A1 * | 6/2013 | ............ | B02C 17/18 |
| WO | WO 2016/030579 A1 | 3/2016 | | |
| WO | WO-2016030579 * | 3/2016 | ............. | B66F 9/061 |
| WO | WO-2018112524 A1 * | 6/2018 | ............. | B02C 17/22 |

\* cited by examiner

MILL LINER INSTALLATION

PRIORITY DOCUMENT

The present application claims priority from Australian Provisional Application No. 2016905248 titled "MILL LINER INSTALLATION" filed on 19 Dec. 2016, the content of which is hereby incorporated by reference in its entirety.

BACKGROUND OF THE INVENTION

The present invention relates to a method and system for installing mill liners.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Liners are secured to the inside of grinding mills with fasteners. FIG. 1A shows a common fastener assembly used for securing these liners. The bolt has an oblong head that is located in an oblong cavity in the liner. The bolt is inserted into the liner and through the casing of the mill by an operator on the inside of the mill. Reline personnel on the outside of the mill then install a nut and washer onto the bolt and tighten it using various torque tools.

This current fastening method exposes the operator on the inside of the mill to many hazards. The inside of the mill is classified as a confined space, the floor of the mill is uneven, there is poor visibility, there is the potential for falling objects to strike the operator (steel balls and rocks wedged in the liners), the atmosphere is hot and humid, communication is difficult, the operators are in close proximity to working machinery and suspended loads and, in order to place the bolts through the liners, reline personnel are often required to climb up the mill shell and work at heights.

SUMMARY OF THE PRESENT INVENTION

In one broad form, an aspect of the present invention seeks to provide a method for use in installation of a mill liner, the method including:
a) retaining a mounting bolt at least partially within a liner opening extending through the mill liner;
b) positioning the mill liner against a mill shell so that the retained mounting bolt is aligned with a mill shell opening extending through the mill shell;
c) selectively coupling an extraction tool to the mounting bolt from outside the mill shell;
d) detaching the mounting bolt from the liner using the extraction tool;
e) pulling the mounting bolt through the mill shell opening using the extraction tool so that an end of the mounting bolt projects from the mill shell opening; and,
f) securing a fastener onto the mounting bolt to thereby attach the mill liner to the mill.

In one embodiment, retaining the mounting bolt at least partially within the liner opening includes the steps of:
a) attaching the mounting bolt to a bolt housing; and,
b) attaching the bolt housing to the mill liner.

In one embodiment, the bolt housing is attached to the mill liner using at least one of:
a) an adhesive;
b) magnets; and,
c) mechanical engagement with the mill liner.

In one embodiment, the mounting bolt is attached to the bolt housing using at least one of:
a) an adhesive;
b) magnets;
c) mechanical engagement with the bolt housing;
d) a friction fit; and,
e) an interference fit.

In one embodiment, at least part of the bolt housing is movably located within an outer housing and a biasing member is interposed between the bolt housing and the outer housing and is operable to urge the mounting bolt from a retracted position to an extended position, and wherein in the retracted position an end of the mounting bolt is fully contained within the liner opening and in the extended position the end of the mounting bolt extends at least partially from the liner opening.

In one embodiment, the bolt housing is a sacrificial member that remains attached to the liner after liner installation.

In one embodiment, the sacrificial member is a cap that at least partially surrounds the head of the mounting bolt.

In one embodiment, the cap is at least partially secured to the mounting bolt by a tie.

In one embodiment, retaining the mounting bolt at least partially within the liner opening includes directly bonding the mounting bolt to the liner via an adhesive or foam.

In one embodiment, retaining the mounting bolt at least partially within the liner opening includes the steps of:
a) fastening a sacrificial clip to the head of the mounting bolt;
b) positioning the mounting bolt into the liner opening; and,
c) securing the sacrificial clip to the liner.

In one embodiment, the sacrificial clip is secured to the liner by an adhesive.

In one embodiment, retaining the mounting bolt at least partially within the liner opening includes the steps of:
a) fastening a permanent clip to the head of the mounting bolt;
b) attaching a holder assembly to the permanent clip;
c) positioning the mounting bolt into the liner opening using the holder assembly;
d) causing the permanent clip to expand against an internal surface of the liner opening; and,
e) releasing the holder assembly from the clip.

In one embodiment, the permanent clip is fastened to the mounting bolt by a fastener and the permanent clip is caused to expand against the internal surface of the liner opening by tightening the fastener.

In one embodiment, the method includes retaining the mounting bolt at least partially within the liner prior to transporting the liner into the mill.

In one embodiment, the extraction tool is coupled to the mounting bolt using at least one of:
a) an adhesive;
b) magnets;
c) mechanical engagement with the mounting bolt;
d) a friction fit;
e) an interference fit; and,
f) a screw fit.

In one embodiment, a threaded socket is attached to the extraction tool for engagement onto a mating threaded protrusion on an end of the mounting bolt.

In one embodiment, the method includes loading the fastener onto the extraction tool prior to coupling with the mounting bolt.

In one embodiment, the method includes using the extraction tool to impart an axial load to the mounting bolt to at least one of:
 a) detach the mounting bolt from the liner; and,
 b) pull the mounting bolt through the mill shell opening.

In one embodiment, the axial load is an impact load that is transmitted to the mounting bolt.

In one embodiment, the extraction tool includes a reciprocating member that is manually moved back and forth over a shaft of the extraction tool and caused to impact a stop member to thereby generate the axial impact load.

In one embodiment, the axial load is generated by actuating a hydraulic cylinder of the extraction tool.

In one embodiment, the method includes releasing the fastener from the extraction tool and engaging it onto the mounting bolt while the extraction tool remains coupled to the mounting bolt.

In one embodiment, the fastener includes a nut and the method includes threadingly engaging the nut onto a thread of the mounting bolt.

In one embodiment, the method includes uncoupling the extraction tool from the mounting bolt once the fastener has been secured to the mounting bolt.

In another broad form, an aspect of the present invention seeks to provide a mill liner installation system including:
 a) a mounting bolt;
 b) a retainer that retains the mounting bolt at least partially within a liner opening extending through the mill liner thereby allowing the mill liner to be positioned within the mill with the mounting bolt aligned with a mill shell opening extending through the mill shell;
 c) an extraction tool that in use is inserted through the mill shell opening from outside the mill shell, and selectively coupled to the mounting bolt, thereby allowing the mounting bolt to be detached from the retainer and pulled through the mill shell opening so that an end of the mounting bolt projects from the mill shell opening; and,
 d) a fastener that in use is attached to the mounting bolt to thereby attach the mill liner to the mill.

In one embodiment, the retainer is at least one of:
 a) a bolt housing that is attached to the mill liner and the mounting bolt;
 b) a clip that is attached to the mounting bolt and mill liner; and,
 c) an adhesive or foam that retains the mounting bolt within the liner opening.

In one embodiment, the bolt housing is attached to the mill liner using at least one of:
 a) an adhesive;
 b) magnets; and,
 c) mechanical engagement with the mill liner.

In one embodiment, the mounting bolt is attached to the bolt housing using at least one of:
 a) an adhesive;
 b) magnets;
 c) mechanical engagement with the bolt housing;
 d) a friction fit; and,
 e) an interference fit.

In one embodiment, at least part of the bolt housing is movably located within an outer housing and a biasing member is interposed between the bolt housing and the outer housing and is operable to urge the mounting bolt from a retracted position to an extended position, and wherein in the retracted position an end of the mounting bolt is fully contained within the liner opening and in the extended position the end of the mounting bolt extends at least partially from the liner opening.

In one embodiment, the bolt housing is a sacrificial member that remains attached to the liner after liner installation.

In one embodiment, the sacrificial member is a cap that at least partially surrounds the head of the mounting bolt.

In one embodiment, the cap is at least partially secured to the mounting bolt by a tie.

In one embodiment, the clip is a sacrificial clip that is fastened to the head of the mounting bolt.

In one embodiment, the sacrificial clip is secured to the liner by an adhesive.

In one embodiment, the clip is a permanent clip that is fastened to the head of the mounting bolt.

In one embodiment, the system further includes a holder assembly that is releasably attached to the permanent clip to allow the mounting bolt to be positioned into the liner opening.

In one embodiment, the permanent clip is caused to expand against an internal surface of the liner opening to thereby retain the mounting bolt within the liner.

In one embodiment, a tensioning tool is used to tighten a clip fastener to the head of the mounting bolt to thereby cause the permanent clip to expand in the liner opening.

In one embodiment, the extraction tool is coupled to the mounting bolt using at least one of:
 a) an adhesive;
 b) magnets;
 c) mechanical engagement with the mounting bolt;
 d) a friction fit;
 e) an interference fit; and,
 f) a screw fit.

In one embodiment, a threaded socket is attached to the extraction tool for engagement onto a mating threaded protrusion on an end of the mounting bolt.

In one embodiment, the extraction tool includes a biasing mechanism to urge the mounting bolt through the mill shell opening.

In one embodiment, the extraction tool includes:
 a) a shaft, the shaft having:
  i) a connector that attaches to the mounting bolt in use; and,
  ii) a stop member radially projecting from the shaft;
 b) a reciprocating member that is manually moved back and forth over the shaft and caused to impact the stop member to thereby generate an axial impact load for detaching the mounting bolt from the liner and urging the mounting bolt through the mill shell opening.

In one embodiment, the extraction tool includes:
 a) a body;
 b) a shaft movably mounted within the body, the shaft having a connector that attaches to the mounting bolt in use; and,
 c) a piston coupled to the shaft, to move the shaft relative to the body and thereby pull the mounting bolt through the mill shell opening.

In one embodiment, the fastener includes a nut that threadingly engages a thread on the mounting bolt.

In one embodiment, the fastener is mounted on the extraction tool, allowing the fastener to engage the mounting bolt while the extraction tool is coupled to the mounting bolt.

In yet a further broad form the present invention seeks to provide a mill liner installation method including:
  a) prior to installing the mill liner retaining the mounting bolt so that the mounting bolt is positioned at least partially within a liner opening extending through the mill liner;
  b) mounting the mill liner within the mill with the mounting bolt positioned within the liner opening;
  c) inserting an extraction tool through a mill opening in the mill;
  d) selectively coupling the extraction tool to the mounting bolt;
  e) detaching the mounting bolt from the liner;
  f) pulling the mounting bolt through the mill opening so that an end of the mounting bolt projects from the mill opening; and,
  g) attaching a fastener to the mounting bolt to thereby attach the mill liner to the mill.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

An example of the present invention will now be described with reference to the accompanying drawings, in which.

DETAILED DESCRIPTION OF THE PREFERRED EMBODIMENTS

Figure 1A:
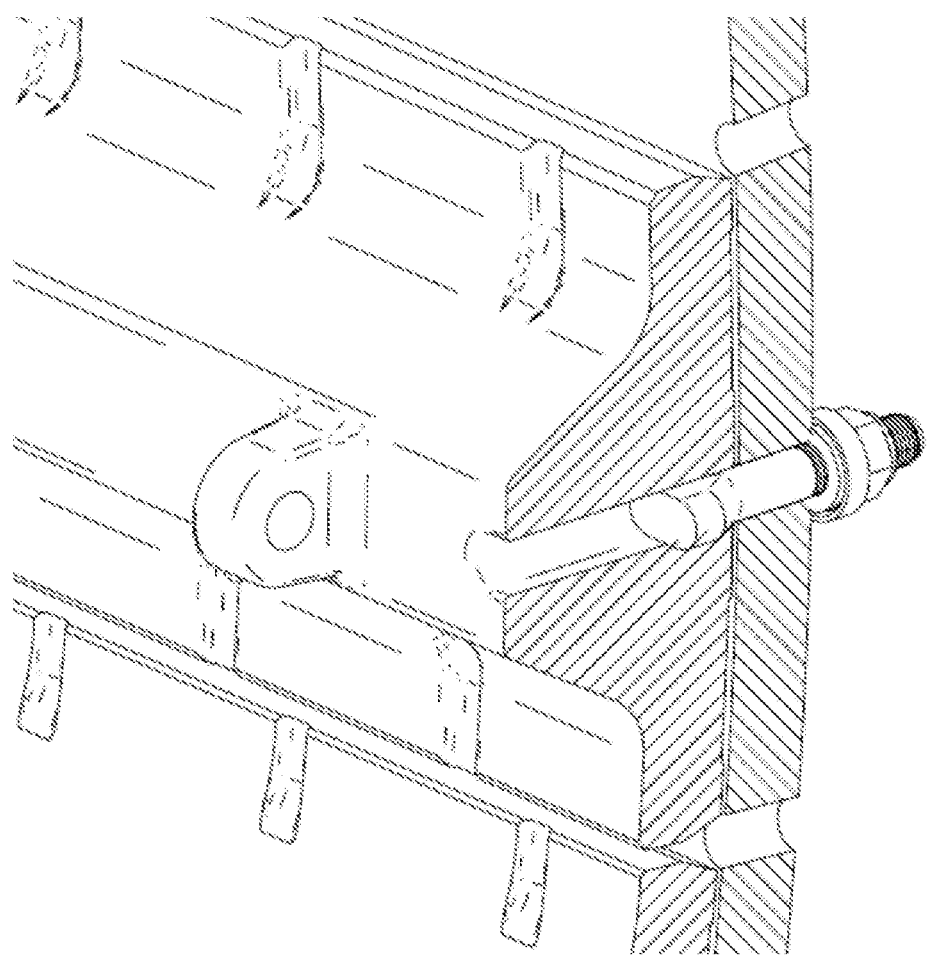
FIG. 1A is a schematic perspective cross sectional view of a traditional mill liner installation arrangement.
Figure 1B:
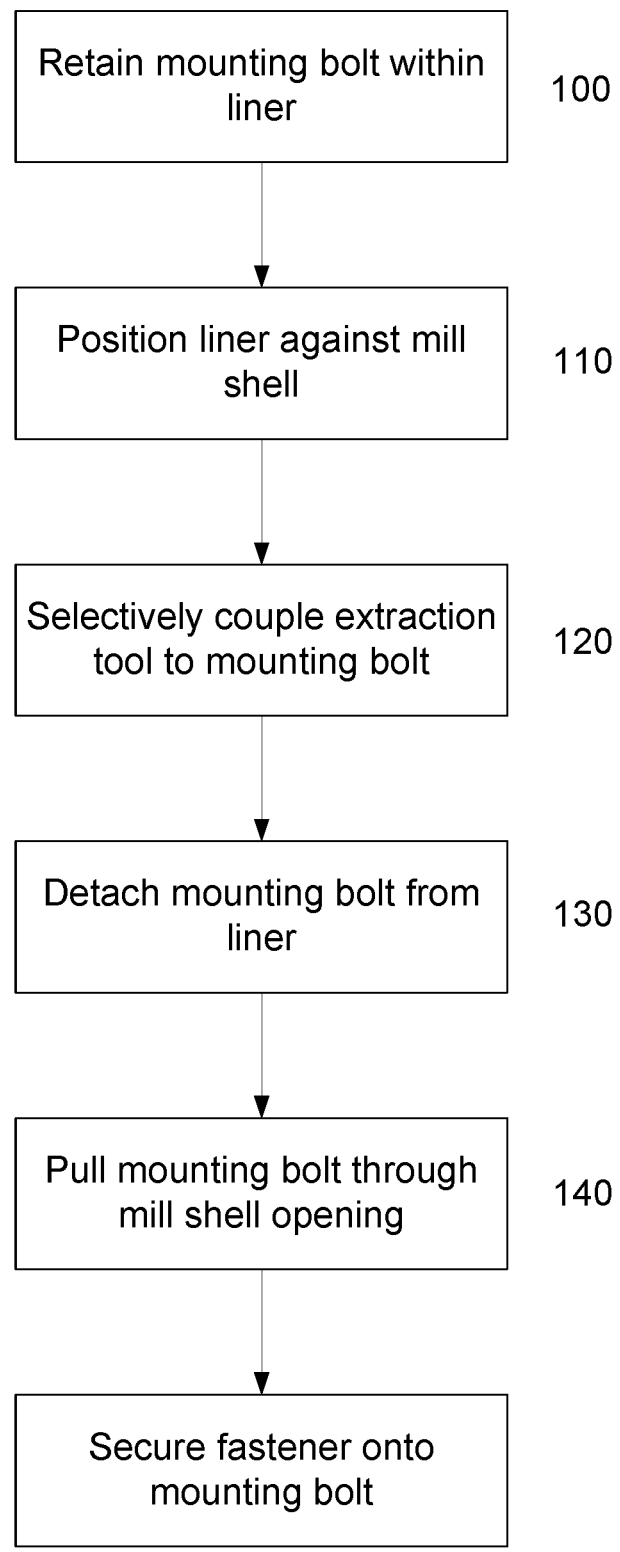
FIG. 1B is a flow diagram of an example of a method for use in installation of a mill liner.

An example of a method for use in installation of a mill liner shall now be described with reference to FIG. 1B.

In this example, at step 100 the method includes retaining a mounting bolt at least partially within a liner opening extending through the mill liner. It will be understood that the mounting bolt is intended to refer to a liner bolt used to mount the liner to the mill shell. The mounting bolt may be retained by any suitable means and will be described in further detail below.

At step 110, the method includes positioning the mill liner against a mill shell so that the retained mounting bolt is aligned with a mill shell opening extending through the mill shell. This positioning may be achieved using a mill reline machine (MRM) that may be operated autonomously by an operator located outside the mill. The liner plate is typically attached to the MRM and raised into position and supported whilst the liner is mounted.

At step 120, the method includes selectively coupling an extraction tool to the mounting bolt from outside the mill shell. The extraction tool is typically handled by an operator outside the mill and inserted through the opening in the mill shell so that it can be coupled to the mounting bolt.

The mounting bolt is then detached from the liner using the extraction tool at step 130 and then pulled through the mill shell opening at step 140 so that an end of the mounting bolt projects from the mill shell opening (i.e. outside the mill). The extraction tool may be a manual tool or it may be powered for example using a hydraulic cylinder that can be actuated and used to urge the mounting bolt through the mill shell opening.

Finally, at step 140 the method includes securing a fastener onto the mounting bolt to thereby attach the mill liner to the mill. The fastener may include a nut and washer that can be run onto the bolt and tensioned so as to secure the liner to the mill.

In the above example, it will be appreciated that whilst reference is made to a single mounting bolt, in practice multiple mounting bolts would be used to secure each of a number of mill liners to the mill, with these being extracted using a single extraction tool.

The above described method may be advantageously used in order to allow mounting bolts to be attached to a mill liner, prior to the mill liner being installed. The mounting bolts can then be pulled through the mill shell using an extraction tool, and secured in position, allowing mill liners to be installed without requiring an installer to enter the mill. The mounting bolts are typically retained in the liner prior to the liner being transported into the mill. Manipulation of the liner inside the mill may be performed autonomously and/or remotely by the mill reline machine and the mounting bolt is able to be accessed and manipulated by an installer located outside the mill shell using the extraction tool.

The mill liner installation method therefore permits the installer to be removed from the inside of the mill which improves safety and eliminates many of the hazards that installers have previously been exposed to when performing routine liner replacement and installation.

A number of further features will now be described.

Typically, retaining the mounting bolt at least partially within the liner opening includes the steps of attaching the mounting bolt to a bolt housing, and, attaching the bolt housing to the mill liner. In this regard, the bolt housing may be attached to the mill liner using at least one of an adhesive, magnets, and, mechanical engagement with the mill liner. For example, an attachment feature such as detent can be cast into the liner or liner opening with a corresponding engagement feature being formed in the bolt housing to secure it to the liner.

The mounting bolt may be attached to the bolt housing by any suitable means including, but not limited to at least one of an adhesive, magnets, mechanical engagement with the bolt housing, a friction fit, and, an interference fit or the like.

In one example, at least part of the bolt housing is movably located within an outer housing and a biasing member is interposed between the bolt housing and the outer housing and is operable to urge the mounting bolt from a retracted position to an extended position, and wherein in the retracted position an end of the mounting bolt is fully contained within the liner opening and in the extended position the end of the mounting bolt extends at least partially from the liner opening. In this example, the mounting bolt is attached to the bolt housing by a first magnet and the outer housing is attached to the liner by a second magnet.

In some examples, the bolt housing is a sacrificial member that remains attached to the liner after liner installation. Such a sacrificial member can be manufactured from a material that passes through the grinding and floatation process without degrading the efficiency of the mineral recovery circuit. Therefore the sacrificial member can be left in the mill after bolt insertion.

In one example, the sacrificial member is a cap that at least partially surrounds the head of the mounting bolt. The cap may be at least partially secured to the mounting bolt by a tie, such as a cable tie. Such a cap may be suitable for use when the mounting bolt is longer than the depth of the liner and as a result the head of the mounting bolt extends above the upper face of the liner.

In another example, retaining the mounting bolt at least partially within the liner opening includes directly bonding the mounting bolt to the liner via an adhesive or foam. Any suitable adhesive may be used that is applied to the bolt and/or the liner to temporarily secure the bolt to the liner. In the case of foam, foam could be provided within or around the liner opening to thereby retain the mounting bolt within the opening. This method minimises the items left behind in the mill following bolt insertion.

In a further example, retaining the mounting bolt at least partially within the liner opening includes the steps of fastening a sacrificial clip to the head of the mounting bolt, positioning the mounting bolt into the liner opening; and, securing the sacrificial clip to the liner. The sacrificial clip may be secured to the liner by an adhesive. This method may be suitable for example when the depth of the liner is greater than the length of the mounting bolt resulting in the head of the mounting bolt being disposed below the upper surface of the liner when retained. When the mounting bolt is pulled through the mill shell, the mounting bolt breaks free from the sacrificial clip which remains secured to the liner.

Alternatively, the method may include retaining the mounting bolt at least partially within the liner opening includes the steps of fastening a permanent clip to the head of the mounting bolt, attaching a holder assembly to the permanent clip, positioning the mounting bolt into the liner opening using the holder assembly, causing the permanent clip to expand against an internal surface of the liner opening, and, releasing the holder assembly from the clip. Typically, the permanent clip is fastened to the mounting bolt by a fastener and the permanent clip is caused to expand against the internal surface of the liner opening by tightening the fastener using a torque wrench for example. In this example, the permanent clip remains attached to the mounting bolt as the mounting bolt is pulled through the mill shell. As it is pulled through, the permanent clip deforms but remains attached to the mounting bolt. This method also minimises items left behind in the mill following bolt insertion.

It will be appreciated that in all of the above examples, the mounting bolt may be retained at least partially within the liner prior to transporting the liner into the mill which advantageously removes the need for the operator to be inside the mill during installation.

Typically, the extraction tool is coupled to the mounting bolt using at least one of an adhesive, magnets, mechanical engagement with the mounting bolt, a friction fit, an interference fit, and, a screw fit. In one preferred arrangement, a threaded socket is attached to the extraction tool for engagement onto a mating threaded protrusion on an end of the mounting bolt. Typically, the socket and bolt thread are tapered.

Typically, the method includes loading the fastener onto the extraction tool prior to coupling with the mounting bolt. The fastener such as a nut and washer may be retained on the extraction tool for deployment onto the mounting bolt after it has been pulled through the mill shell.

In one example, the method includes using the extraction tool to impart an axial load to the mounting bolt to at least one of detach the mounting bolt from the liner; and, pull the mounting bolt through the mill shell opening. Typically, the axial load is an impact load that is transmitted to the mounting bolt. In this regard, the extraction tool may include a reciprocating member that is manually moved back and forth over a shaft of the extraction tool and caused to impact a stop member to thereby generate the axial impact load. The reciprocating member may also retain the fastener.

Alternatively, the axial load may be generated by actuating a hydraulic cylinder of the extraction tool. Such an arrangement may be used on a powered extraction tool whereas the previous arrangement may be used on a manually operated tool.

After the mounting bolt has been pulled through the mill opening, the method includes releasing the fastener from the extraction tool and engaging it onto the mounting bolt while the extraction tool remains coupled to the mounting bolt. This simplifies the installation operation and ensures that the mounting bolt can be securely fastened to the mill prior to disengaging the extraction tool from the mounting bolt.

Typically, the fastener includes a nut and the method includes threadingly engaging the nut onto a thread of the mounting bolt. Once the fastener has been secured to the mounting bolt, the extraction tool can be uncoupled from the mounting bolt.

In another broad form, there is provided a mill liner installation system including a mounting bolt, a retainer that retains the mounting bolt at least partially within a liner opening extending through the mill liner thereby allowing the mill liner to be positioned within the mill with the mounting bolt aligned with a mill shell opening extending through the mill shell, an extraction tool that in use is inserted through the mill shell opening from outside the mill shell, and selectively coupled to the mounting bolt, thereby allowing the mounting bolt to be detached from the retainer and pulled through the mill shell opening so that an end of the mounting bolt projects from the mill shell opening, and, a fastener that in use is attached to the mounting bolt to thereby attach the mill liner to the mill.

Typically, the retainer is at least one of a bolt housing that is attached to the mill liner and the mounting bolt, a clip that is attached to the mounting bolt and mill liner, and, an adhesive or foam that retains the mounting bolt within the liner opening.

In one example, the mounting bolt is attached to a bolt housing by a biasing member that urges the mounting bolt from a retracted to an extended position, and wherein in the retracted position the mounting bolt is fully contained within the liner opening and in the extended position the mounting bolt extends at least partially from the liner opening. This can assist in guiding the positioning of the mill liner, allowing the bolt to be urged partially into the mill opening, when the mill liner is correctly positioned.

In another example, the bolt housing is a sacrificial member that remains attached to the liner after liner installation. For example, the sacrificial member may be a cap that at least partially surrounds the head of the mounting bolt and may be secured thereto by a tie such as a cable tie.

In one example, a sacrificial clip is fastened to the head of the mounting bolt. The sacrificial clip may be secured to the liner by an adhesive. Alternatively, the clip may be a permanent clip that is fastened to the head of the mounting bolt and which remains attached to the mounting bolt after installation. A holder assembly may be releasably attached to the permanent clip to allow the mounting bolt to be positioned into the liner opening. The permanent clip can then be caused to expand against an internal surface of the liner opening to thereby retain the mounting bolt within the liner. In this regard, a tensioning tool such as a torque wrench may be used to tighten a clip fastener attached to the head of the mounting bolt to thereby cause the permanent clip to expand in the liner opening.

The extraction tool can be attached to the mounting bolt using any suitable technique, and examples include, but are not limited to an adhesive, magnets, mechanical engagement with the mounting bolt, a friction fit, an interference fit, a screw fit or the like.

The extraction tool can include a biasing mechanism to assist in urging the mounting bolt through the mill opening. In one example, the extraction tool includes a body, a shaft movably mounted within the body, the shaft having a connector that attaches to the mounting bolt in use and a piston coupled to the shaft, to move the shaft relative to the body and thereby pull the mounting bolt through the mill opening. However, it will be appreciated that other suitable arrangements could be used.

In another example, the extraction tool includes a shaft, the shaft having a connector that attaches to the mounting bolt in use, and, a stop member radially projecting from the shaft. The tool may further include a reciprocating member that is manually moved back and forth over the shaft and caused to impact the stop member to thereby generate an axial impact load for detaching the mounting bolt from the liner and urging the mounting bolt through the mill shell opening.

The fastener can include a nut that threadingly engages a thread on the mounting bolt, although it will be appreciated that any suitable fastener could be used. In one example, the fastener can be mounted on the extraction tool, allowing the fastener to engage the mounting bolt while the extraction tool is coupled to the mounting bolt.

In a further broad form, there is provided a mill liner installation method including: prior to installing the mill liner, retaining the mounting bolt so that the mounting bolt is positioned at least partially within a liner opening extending through the mill liner, mounting the mill liner within the mill with the mounting bolt positioned within the liner opening; inserting an extraction tool through a mill opening in the mill, selectively coupling the extraction tool to the mounting bolt; detaching the mounting bolt from the liner; pulling the mounting bolt through the mill opening so that an end of the mounting bolt projects from the mill opening, and, attaching a fastener to the mounting bolt to thereby attach the mill liner to the mill.

Figure 2A:
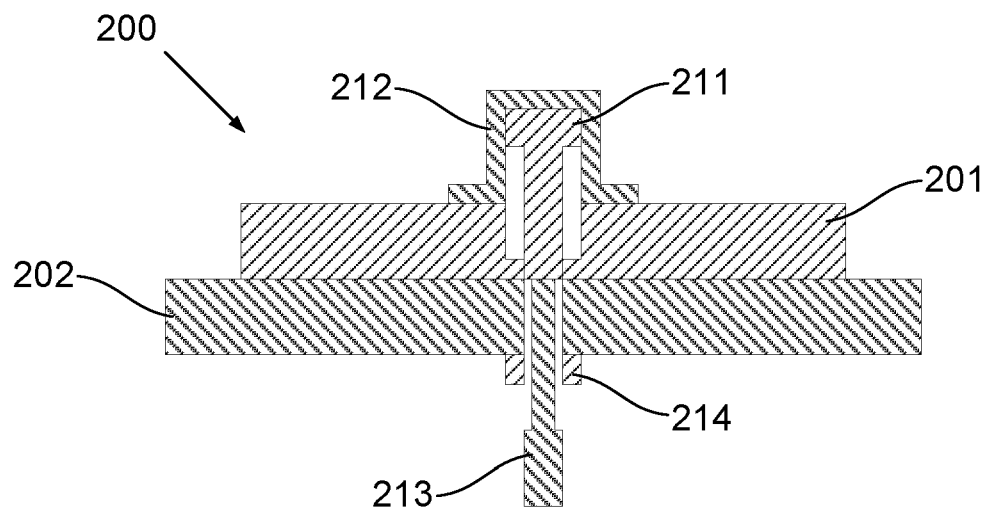
FIG. 2A is a schematic cross sectional view of an example of a mill liner installation system during installation.
Figure 2B:
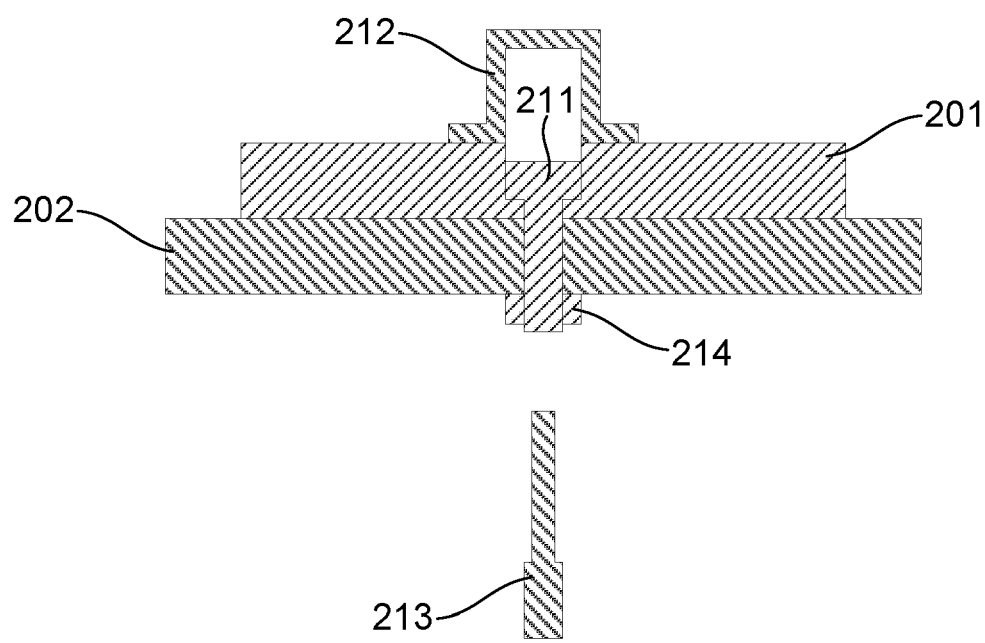
FIG. 2B is a schematic cross sectional view of the installation system of FIG. 2A following installation.

An example of a mill liner installation system shall now be described with reference to FIGS. 2A and 2B.

In this example, the mill liner installation system 200 is used to attach a mill liner 201 to a mill 202. The system includes a mounting bolt 211 and a retainer, which in this example is in the form of a bolt housing 212 attached to the mill liner 201. The retainer is used to retain the mounting bolt 211 at least partially within a liner opening extending through the mill liner 201. This allows the mill liner 201 to be mounted within the mill 202 with the mounting bolt 211 positioned within the liner opening.

An extraction tool 213 is provided that in use is inserted through a mill opening in the mill 202, and selectively coupled to the mounting bolt 211, thereby allowing the mounting bolt 211 to be detached from the bolt housing 212 and pulled through the mill opening so that an end of the mounting bolt 211 projects from the mill opening. A fastener 214 is provided that in use is attached to the mounting bolt 211 to thereby attach the mill liner 201 to the mill.

A typical mill liner installation method using the above described system includes attaching the bolt housing 212 to the mounting bolt 211 and attaching the bolt housing 212 to the mill liner 201 prior to installing the mill liner 201 in the mill so that the mounting bolt 211 is provided at least partially within a liner opening extending through the mill liner 201. These steps can be performed in any order, so that the bolt can be attached to the bolt housing before the bolt housing is attached to the mill liner, or once the mill liner is in situ.

Following this, the mill liner 201 is mounted within the mill 202 with the mounting bolt 211 positioned at least partially within the liner opening. The extraction tool 213 is inserted through a mill opening in the mill 202, and selectively coupled to the mounting bolt 211, as shown for example in FIG. 2A.

Following this, the mounting bolt 211 is detached from the bolt housing 212 and pulled through the mill opening so that an end of the mounting bolt 211 projects from the mill opening. This allows a fastener 214 to be attached to the mounting bolt 211 to thereby attach the mill liner to the mill, with the extraction tool 213 then being removed as shown in FIG. 2B. The bolt housing 212 can also be removed, and or can be left in situ, allowing this to be sacrificed during mill operation.

Figure 3A:
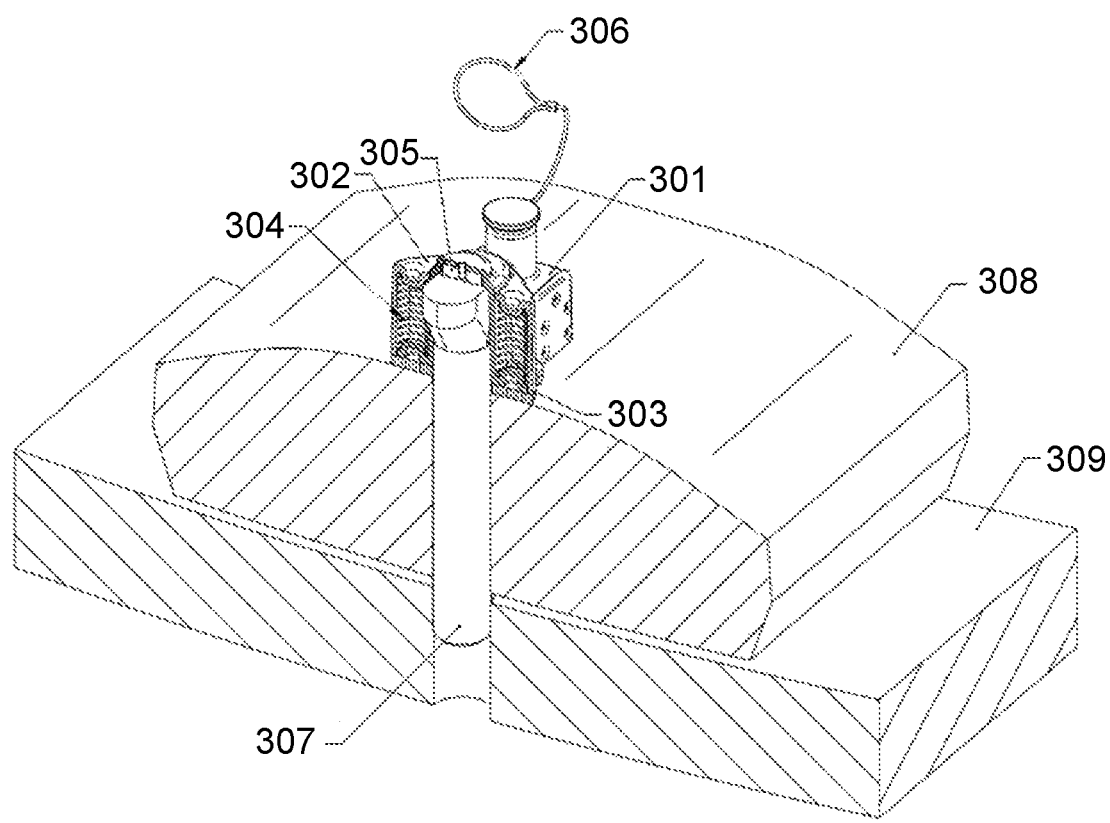
FIG. 3A is a schematic perspective cross sectional view of a further example of a mill liner installation system during installation with a mounting bolt in an extended position.
Figure 3B:
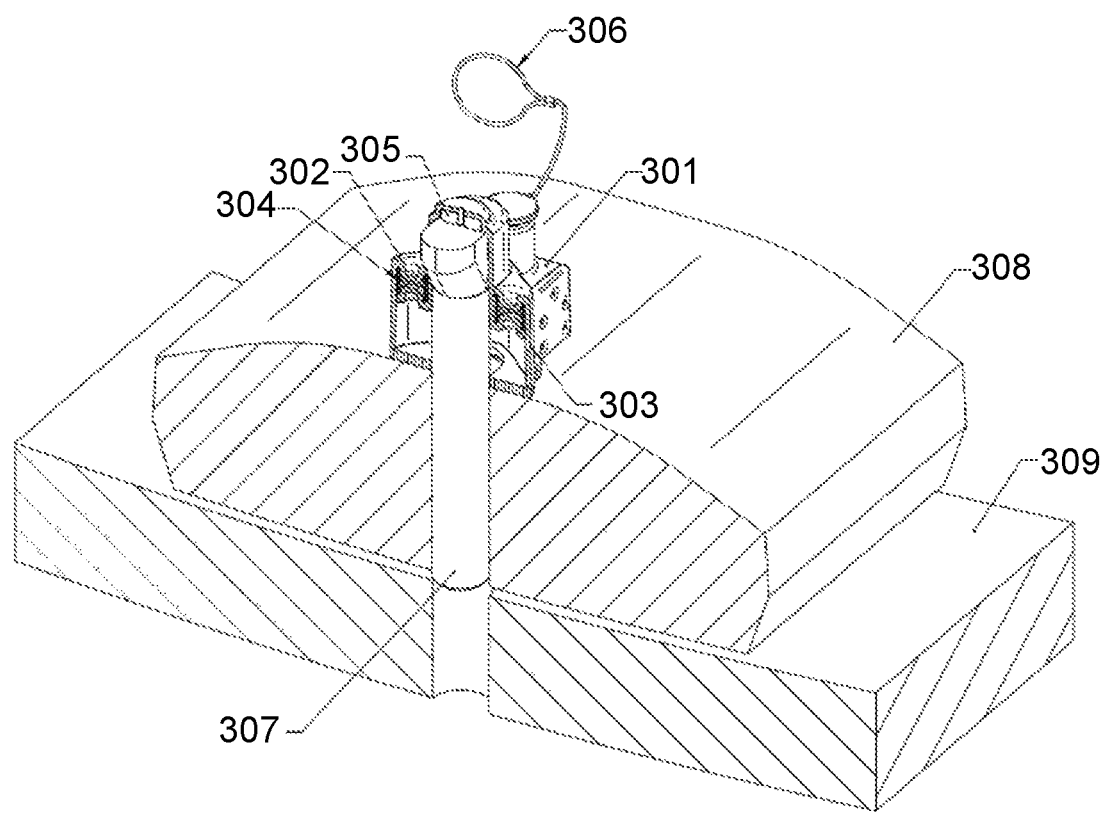
FIG. 3B is a schematic perspective cross sectional view of the installation system of FIG. 3A with the mounting bolt in a retracted position.
Figure 3C:
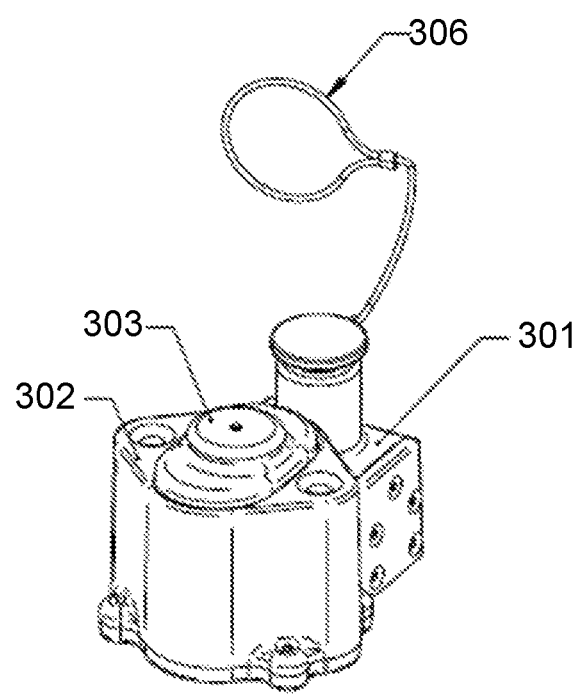
FIG. 3C is a schematic perspective view of the bolt housing of FIG. 3A.

It is to be appreciated that many approaches are possible for retaining the mounting bolt at least partially within the liner opening. One example utilises a magnetic system as shown in FIGS. 3A to 3C.

This tool uses a magnet 305 to attach the mounting bolt 307 to the tool and another magnet 301 to attach the tool to the liner 308. A spring 304 is interposed between the bolt housing 303, which contains a magnet 305, and the outer housing 302 which is mounted to the liner attachment magnet 301. The mounting bolt 307 is held by this arrangement a set distance through the liner 308, as shown in FIG. 3A and is able to be pushed backwards to a position where it is flush with the face of the liner 308 as shown in FIG. 3B. When the liner 308 is being positioned by the liner placement machine (e.g. the mill reline machine) the mounting bolt 307 is able to be forced back into the liner 308 by the mill shell until it is aligned with the hole in the mill shell. When it is aligned with the hole in the mill shell the mounting bolt 307 is pushed by the spring into the hole thereby assisting the operator of the machine with final location. A disadvantage with this tool is that the rubber lining of the mill around the hole can be damaged and dragged by the bolt across the hole preventing the bolt from ejecting and preventing attachment to the bolt from outside of the mill. Another disadvantage is that the spring introduces stored energy that may be released while the operator outside the mill is attaching to the bolt potentially causing injury.

A further method of attaching the bolt to the liner is the use of the magnets as described above but without the use of a spring which eliminates the two potential disadvantages described. A disadvantage of both of these methods is that the tools must be retrieved from the mill after bolt installation.

Figure 4A:
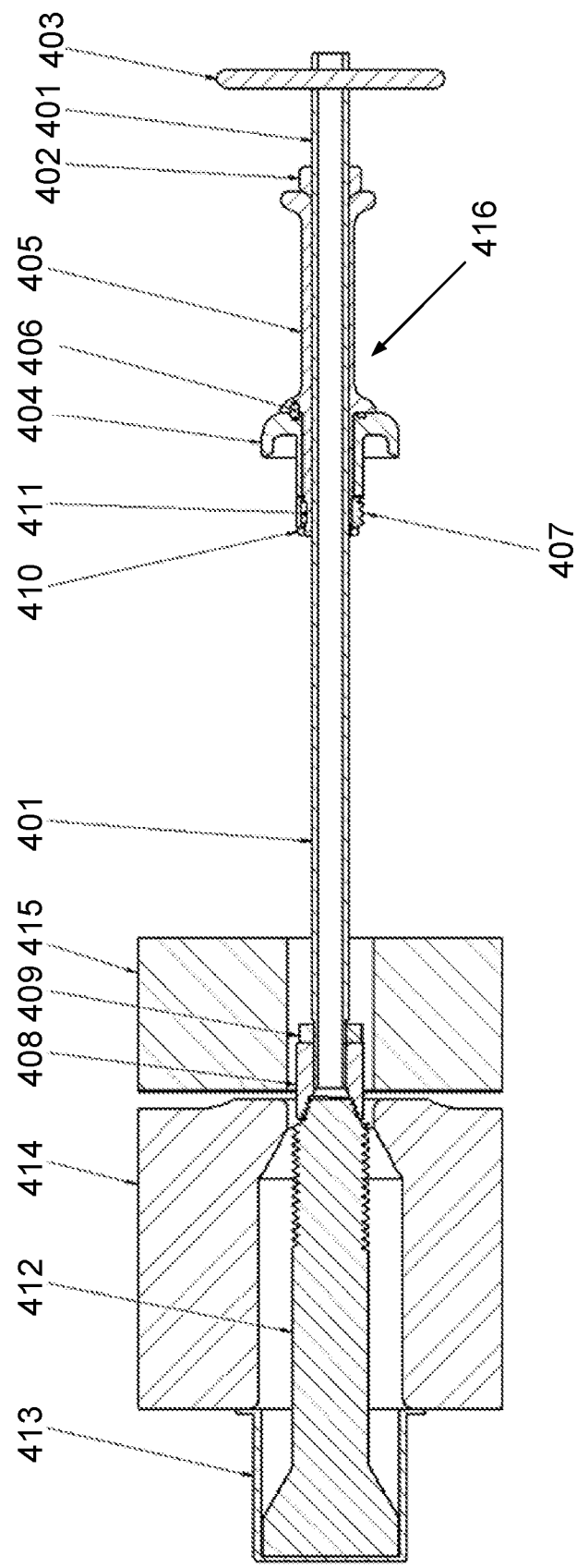
FIG. 4A is a schematic cross sectional view of a further example of a mill liner installation system.

Another method that can be employed to secure the bolts in the liner is the use of a sacrificial cap that is adhered to the bolt and the liner as shown in FIG. 4A. The cap 413 can be manufactured from a material that passes through the grinding and floatation process without degrading the efficiency of the minerals recovery circuit. Thus the caps can be left in the mill after bolt insertion.

As an alternative to using adhesive to bond the sacrificial cap to the liner, an attachment feature such as a detent can be cast into the liner or bolt hole with a corresponding engagement feature being formed in the cap to secure it to the liner.

The mounting bolt may also be directly bonded to the liner. A flexible adhesive or foam may be applied to the bolt and the liner thereby temporarily securing the bolt into the liner opening. This solution minimises the items left behind in the mill following bolt insertion.

The above described methods are suitable for use when the mounting bolt is longer than the depth of the liner and as such the head of the mounting bolt projects above an upper surface of the liner. For mounting bolts that are shorter than the depth of the liner, alternative retaining methods are required, examples of which are illustrated in FIGS. 6A to 7E.

Figure 6A:
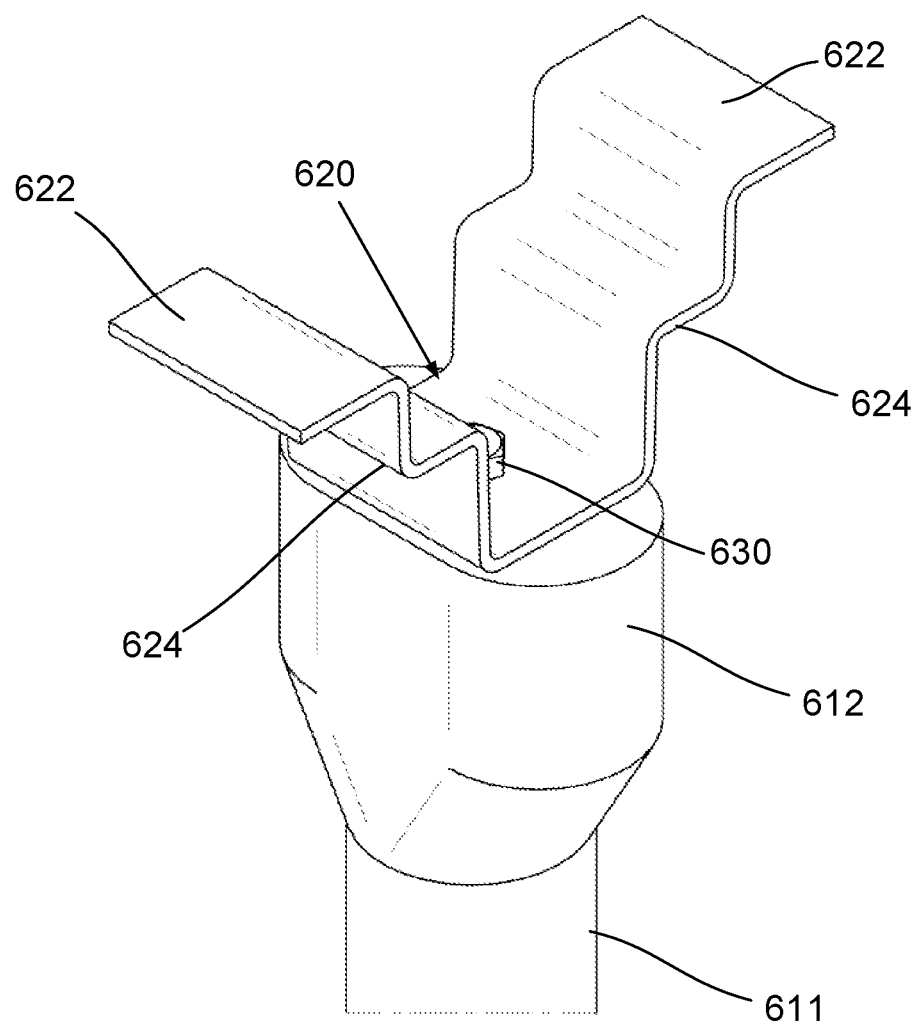
FIG. 6A is a schematic perspective view of an example of a sacrificial clip fastened to a mounting bolt.
Figure 6B:
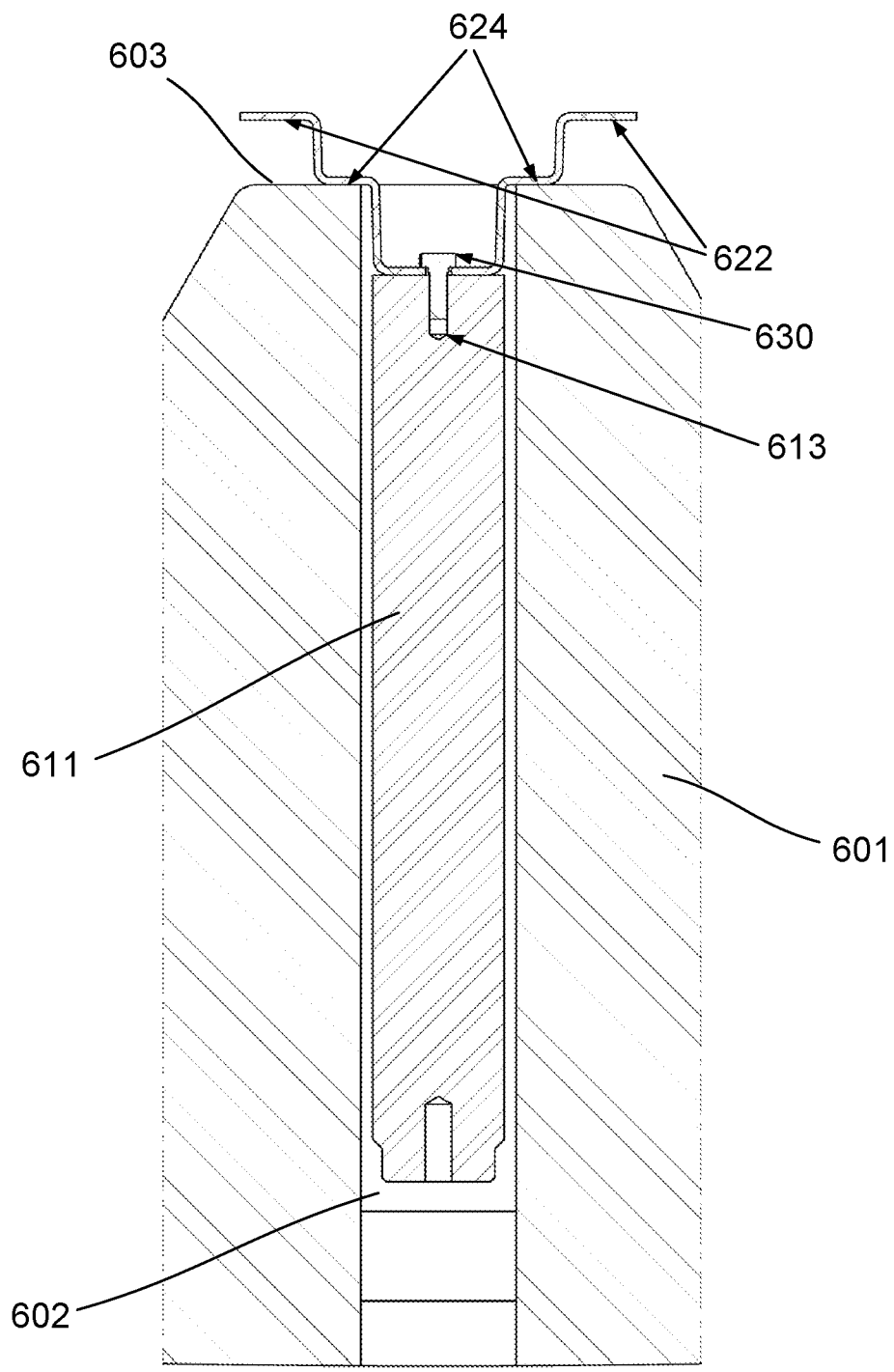
FIG. 6B is a schematic cross sectional view of a mounting bolt retained in a liner by the sacrificial clip of FIG. 6A.

In FIGS. 6A and 6B, there is shown a sacrificial clip 620 mounted to the head 612 of a mounting bolt 611 by a fastener such as a bolt 630. The sacrificial clip 620 has handles 622 enabling the assembly to be carried to a liner 601 and positioned therein as shown in FIG. 6B. The mounting bolt 611 is lowered into the liner opening 602 until flanges 624 of the clip 620 rest on the upper surface 603 of the liner 601. An adhesive may be applied to the underneath surface of these flanges for securing the clip 620 to the liner 601. During installation, the extraction tool pulls the mounting bolt 611 through the mill shell causing fastener 630 to break through the clip 620 thereby detaching the mounting bolt 611 from the liner 601 and leaving the sacrificial clip 620 still attached to the liner 620. In this regard, it is to be understood that the clip 620 may be made from a material such as plastic that is easily able to be left behind in the mill after bolt insertion.

Referring now to FIGS. 7A to 7E, there is shown an example use of a permanent cap 720 that remains secured to the mounting bolt 711 after bolt insertion. In this example, the permanent clip 720 is fastened to the head 712 of the mounting bolt 711 by hand using a fastener such as a bolt 730. The clip 720 is a spring like element that in this example is shaped like an inverted 'V' with opposing ends that rest on the head 712 of the mounting bolt 711 and have edges 724 that project slightly over the edges of the bolt head 712. The clip 720 also has tabs 722 that project outward from opposing sides of the clip 720.

Figure 7A:
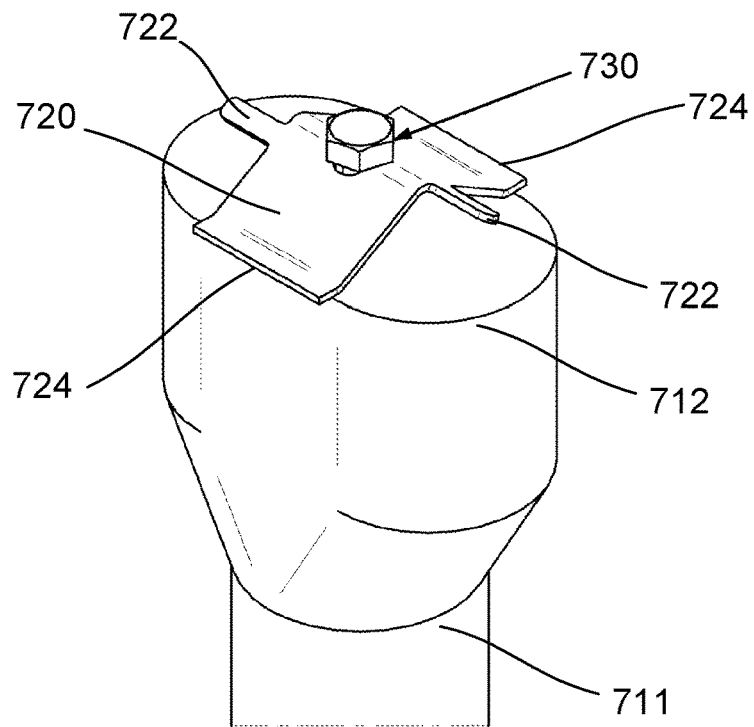
FIG. 7A is a schematic perspective view of an example of a permanent clip fastened to a mounting bolt.
Figure 7B:
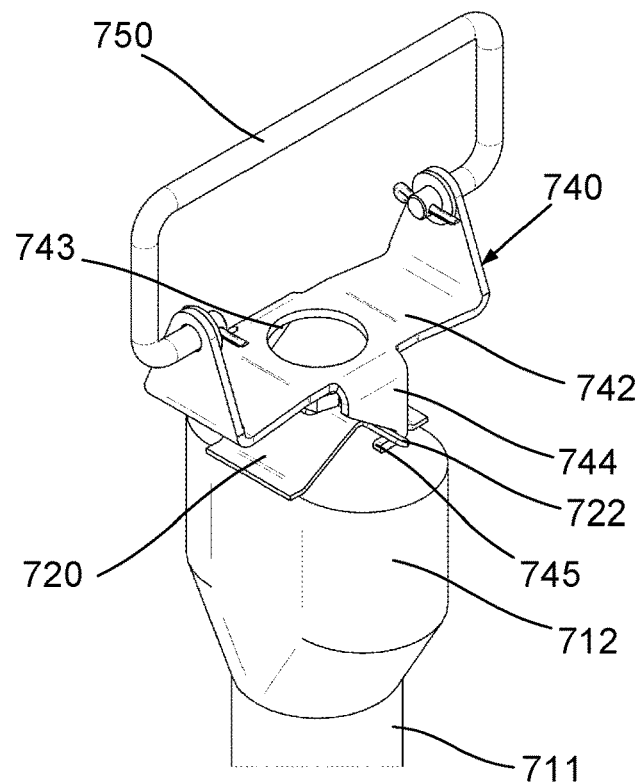
FIG. 7B is a schematic perspective view of a holder assembly releasably secured to the permanent clip of FIG. 7A.
Figure 7C:
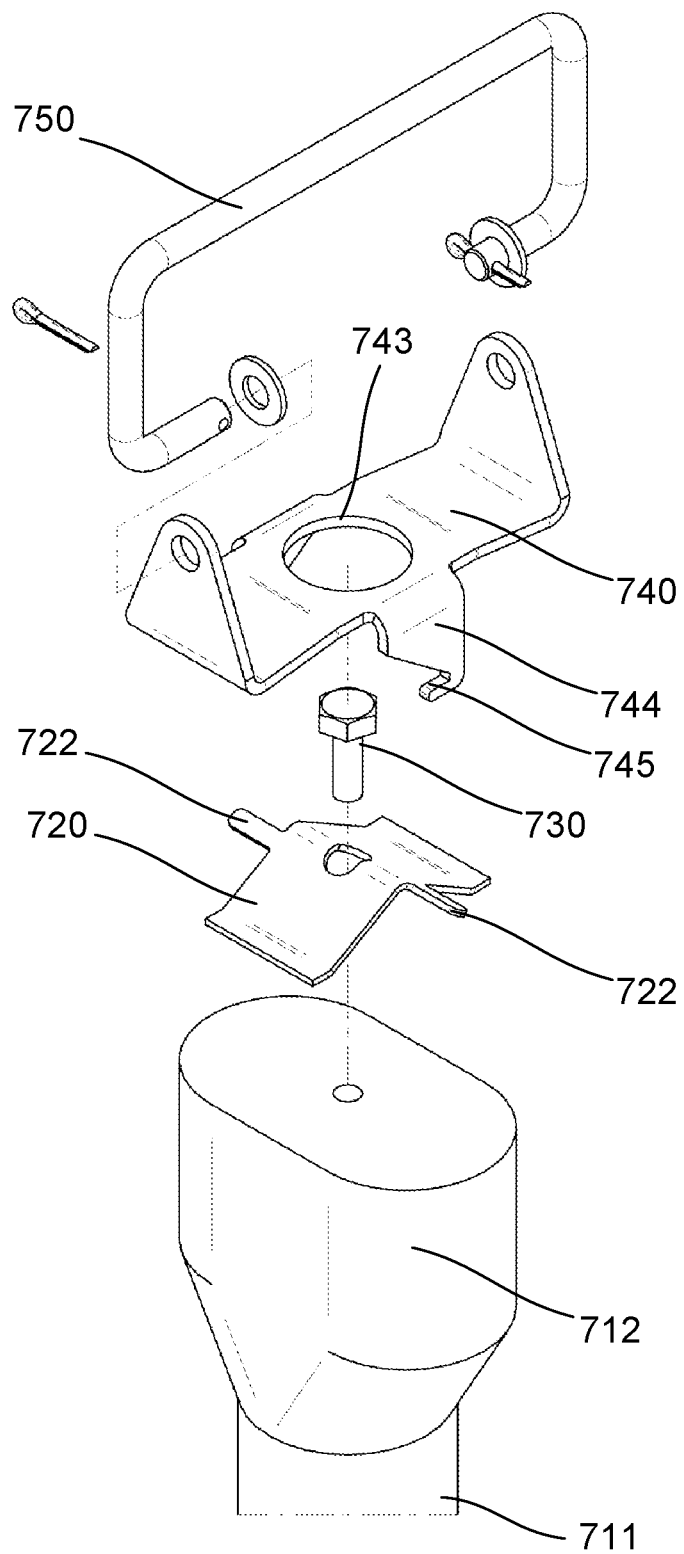
FIG. 7C is a schematic exploded perspective view of the permanent clip, holder assembly and mounting bolt arrangement of FIG. 7B.
Figure 7D:
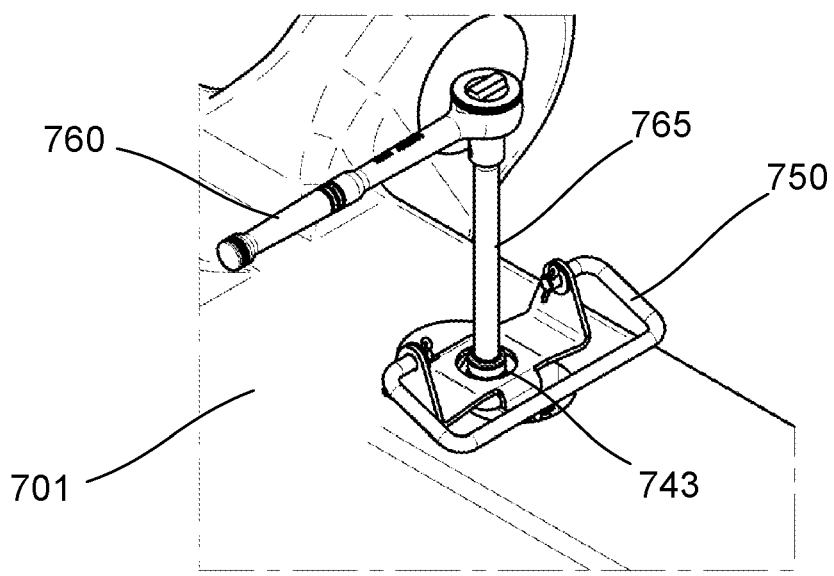
FIG. 7D is a schematic perspective view of the mounting bolt arrangement of FIG. 7A positioned in a liner opening and being retained by tightening a fastener attaching the permanent clip to the mounting bolt which expands the clip against the liner opening; and, FIG. 7E is a schematic cross sectional view of the mounting bolt of FIG. 7A being retained in the liner opening.
Figure 7E:
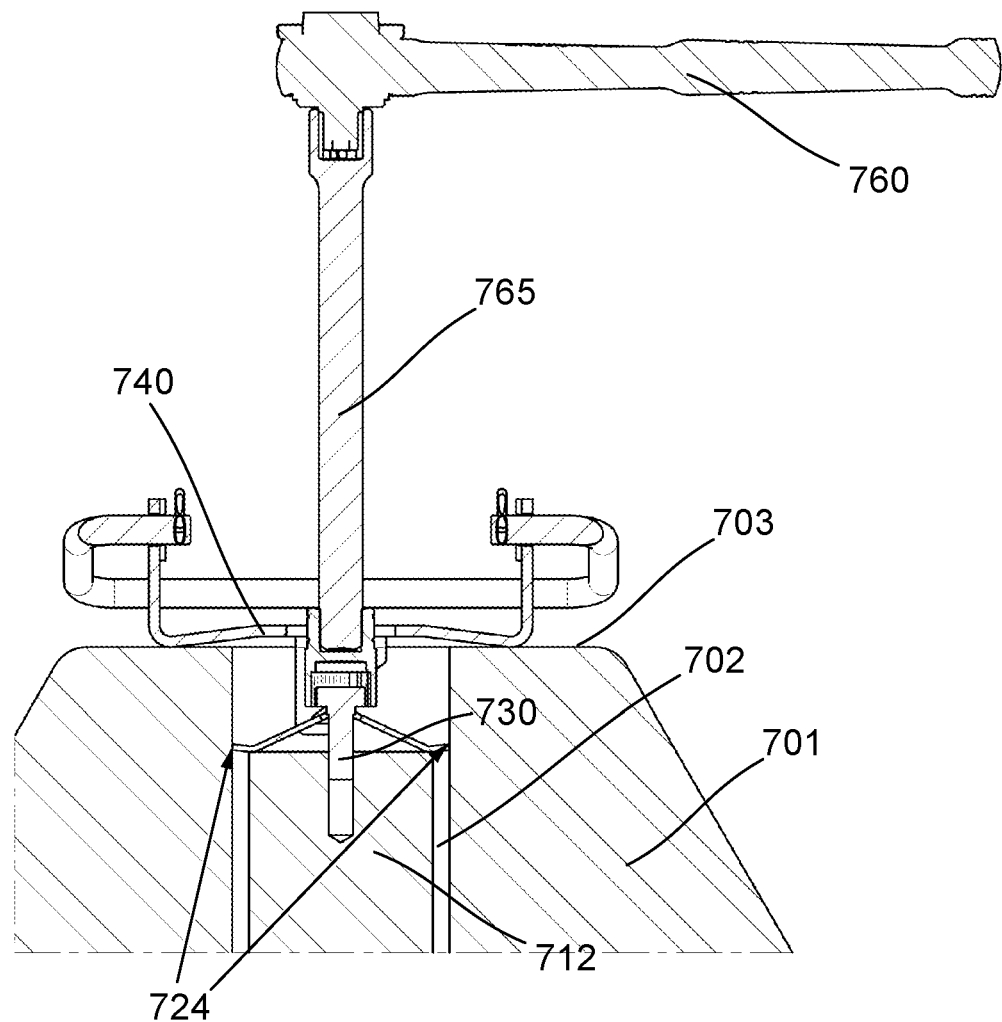

A holder assembly including a cradle 740 and handle 750 is releasably secured to the clip 720 as shown in FIG. 7B. The cradle 740 includes a base 742 with aperture 743 that in use is positioned over fastener 730, and downwardly projecting arms 744 having hooks 745 which operatively engage tabs 722 of the clip 720 to thereby secure the holder assembly to the clip 720. Once secured, an installer may hold onto the handle 750 and lift the mounting bolt 711 to the liner and lower it into the liner opening 702 until base 742 of the cradle 740 rests against the upper surface 703 of the liner 701.

Once in position, an installer may use a torque wrench 760 with extender 765 to tighten bolt 730. As the bolt 730 is tightened, the clip 720 is caused to flatten out and expand against an internal surface of the liner opening 702. In this regard, the edges 724 are deformed and urged into frictional engagement with the liner opening 702. This retains the mounting bolt 712 within the liner 701.

The holder assembly is then rotated a quarter of a turn and released from the clip 720 and mounting bolt assembly. When the mounting bolt 712 is extracted through the mill, the clip 720 deforms but remains attached to the mounting bolt. Typically, permanent clip 720 may be made from a suitable metal such as steel or aluminium.

Several solutions are possible for attaching to the mounting bolt from outside the mill. The first method uses a feature machined or forged into the end of the mounting bolt for the attachment of an extraction tool. This feature could be either a socket or protrusion shaped to engage with a tool. A preferred feature is a tapered thread protrusion as show in FIGS. 4A and 4B on the end of mounting bolt 412. This is engaged by a mating tapered threaded socket 408 attached to the extraction device. This solution has the advantage of self-alignment and centring. The end of the tapered thread on the mounting bolt also presents a large enough surface area for impacting with a hydraulic hammer for mounting bolt removal.

A further example involves using a cap that is screwed onto either the existing thread or a smaller thread machined into the end of the mounting bolt. This cap can be shaped to allow attachment by an attachment tool.

Two classes of extraction tool are possible; manual or powered.

Figure 4B:
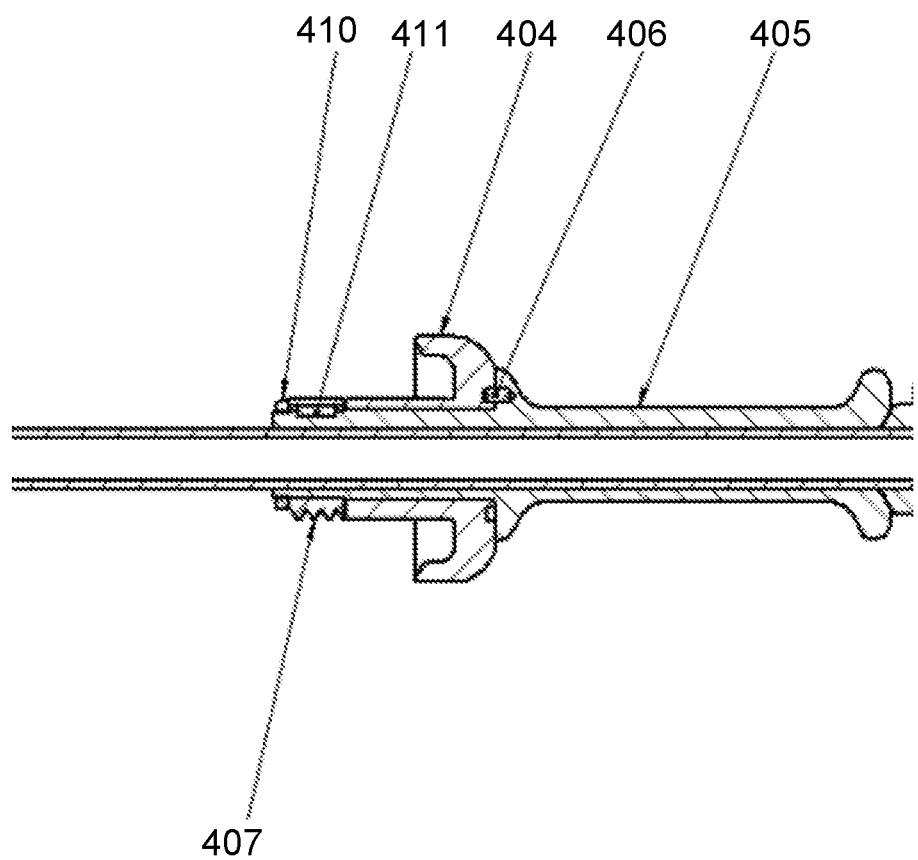
FIG. 4B is a close up view of part of the installation system of FIG. 4A.
Figure 4C:
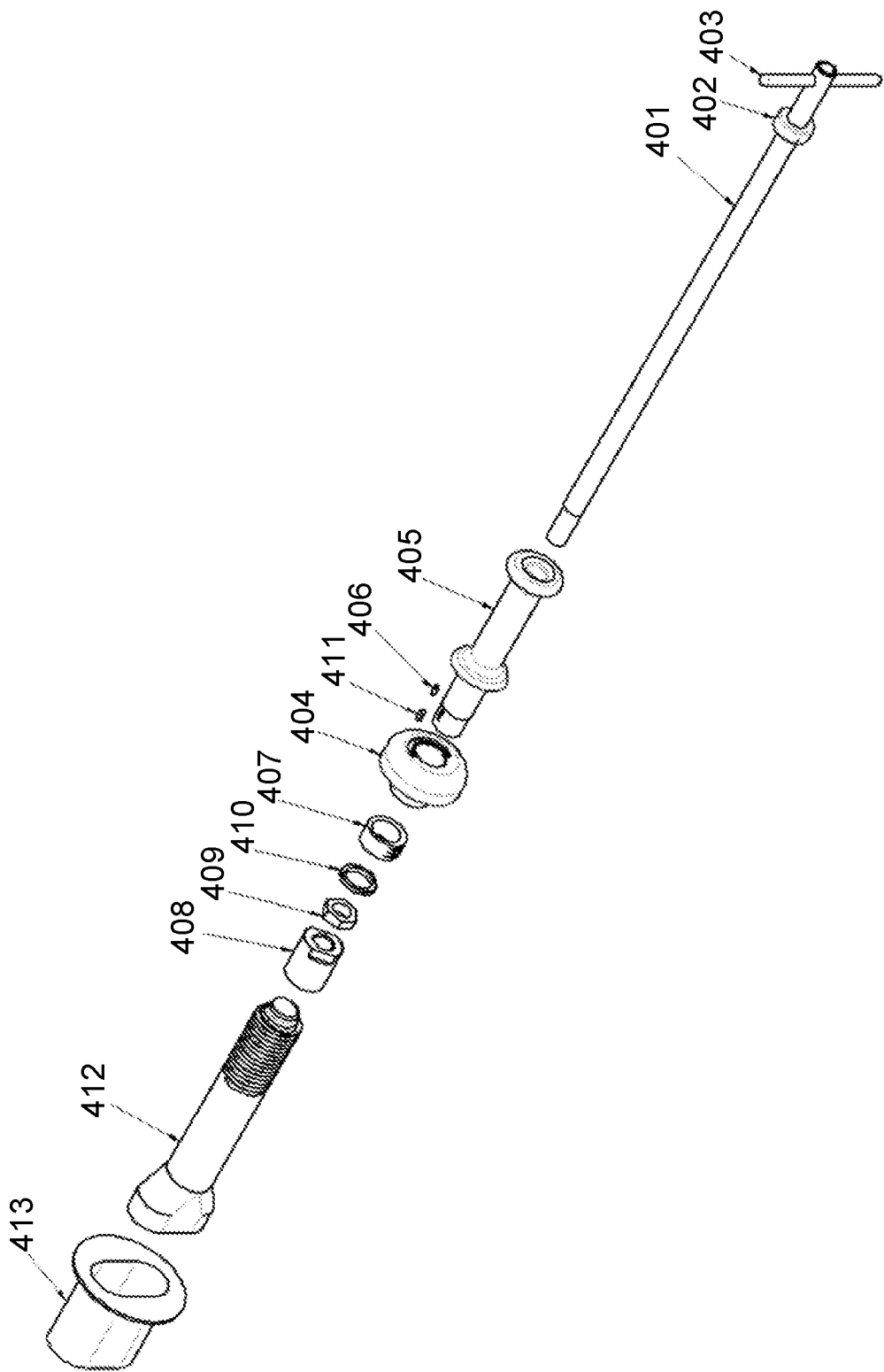
FIG. 4C is a schematic exploded perspective view of the installation system of FIG. 4A.

A preferred embodiment of the manual tool is shown in FIGS. 4A to 4C. This tool consists of a mounting bolt attachment socket 408 secured to the end of a shaft 401 having a handle 403. An integrated hand grip and nut/washer retaining assembly 416 is slidably located on shaft 401.

A nut and washer are first loaded onto the extraction tool passing over the socket 408 and onto a nut engagement sleeve 404 of the retaining assembly 416. The nut engagement sleeve 404 is bored eccentrically and is able to rotate through 180 degrees relative to the hand grip 405. Sleeve 404 is constrained in its rotation angle by a dowel pin 406 secured in hand grip 405 and located to move in a 180 degree radial slot machined into sleeve 404. The hand grip 405 is also bored eccentrically relative to the shaft 401. A thread engagement collar 407 is screwed and keyed (see 410, 411) to the hand grip 405 such that when the sleeve 404 is rotated relative to hand grip 405 to its zero position the collar 407 is aligned with the sleeve 404 allowing a nut and washer to slide freely on and off the sleeve 404 or when rotated 180 degrees the collar 407 moves to be eccentric to the sleeve 404 causing the teeth on the collar 407 to engage with the thread of the nut, locking it on the sleeve 404. The operator is then able to tighten the nut against the sleeve 404 shoulder.

Once the nut and washer are locked onto the retaining assembly 416 the mounting bolt attachment end of the tool (i.e. socket 408) is passed through the mounting bolt hole in the shell of the mill until it is in contact with the end of the mounting bolt 412. The handle 403 is then rotated to screw the socket 408 onto the tapered thread of the mounting bolt. Once secured, the operator grips the hand grip 405 and moves the retaining assembly 416 in a reciprocating motion causing it to impact on the stop 402 welded to the shaft 401. This action is used to dislodge the mounting bolt 412 from the cap 413 or other retaining means and also to urge the mounting bolt 412 through the mill shell. In this example, the retaining assembly 416 is a reciprocating member capable of being moved back and forth along the shaft 401 so as to repetitively impact the stop 402 and thereby transmit an axial load (e.g. axial impact load) to the mounting bolt 412.

When the mounting bolt 412 thread is through the mill shell the operator rotates the nut and sleeve 404 relative to the hand grip 405 thus loosening the nut from the sleeve and also rotating the collar 407 back to its zero position so that the collar and sleeve are aligned. This allows the nut and washer to be slid from the sleeve 404 onto the mounting bolt 412 and rotated to engage with the mounting bolt thread. The handle 403 is then rotated to remove the socket from engagement with the mounting bolt 412 and the tool is extracted. A separate torque tool is then used to tighten the nut onto the mounting bolt.

Figure 5:
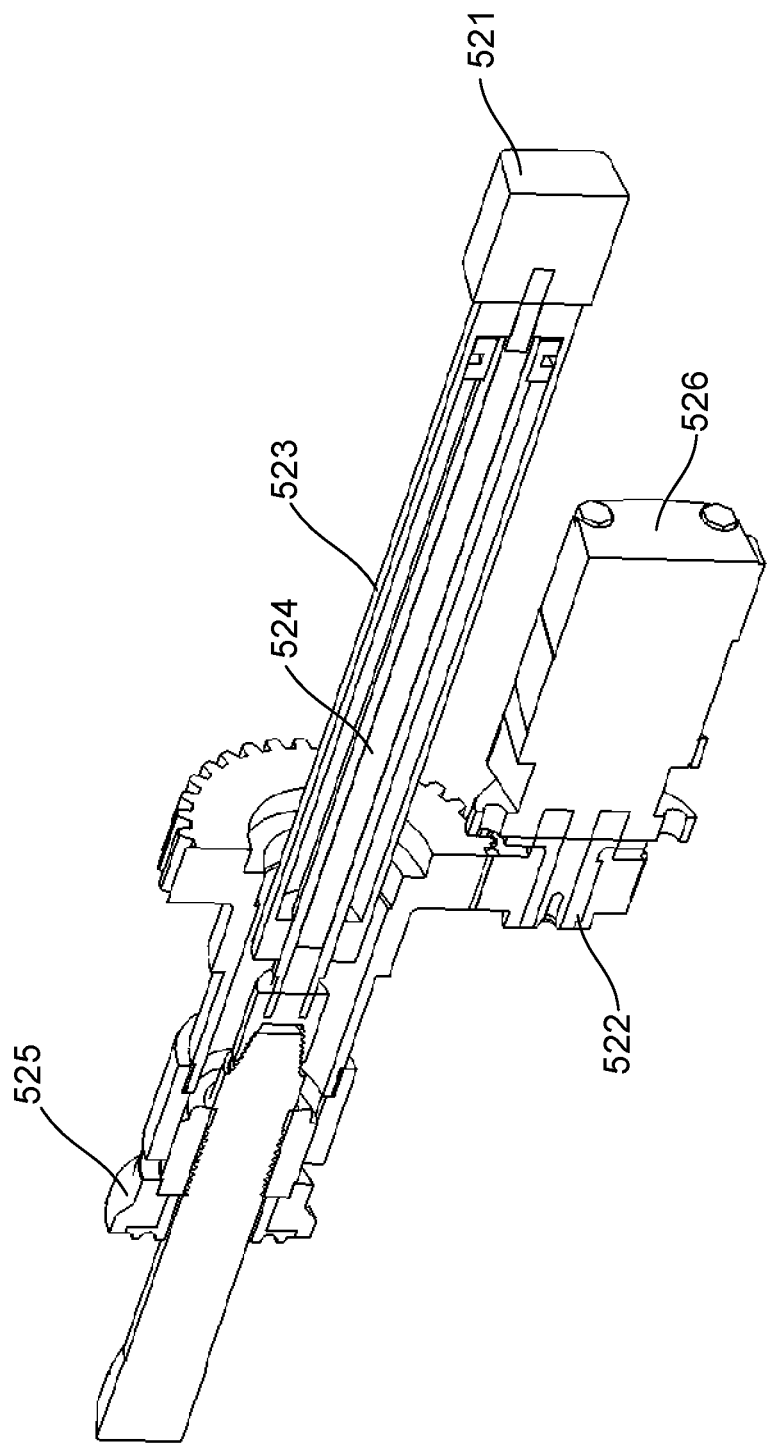
FIG. 5 is a schematic cross sectional perspective view of a further example of a mill liner installation system.

A powered extraction and tensioning tool is shown in FIG. 5. This tool utilises the same mounting bolt connection means as the manual tool. The tapered socket is rotated by a motor 521 mounted to the rear of cylinder 523 driving through the cylinder shaft 524. The hydraulic cylinder is used to dislodge the mounting bolt from the cap and pull it through the mill shell. Once the mounting bolt is extracted to the point where it is in contact with the nut 525 a motor 526, driving through a single or multistage gearbox 522, rotates the nut engaging it with the thread of the mounting bolt. The nut is then run onto the mounting bolt and torqued up to the torque requirements of the fastener arrangement.

Accordingly, the present invention seeks to provide a fastening system that removes the operator from the inside of the mill. This is achieved by positioning the mounting bolt in the liner outside the mill and pulling the mounting bolt through the liner and mill shell from outside of the mill. To achieve this, the system uses a means to attach the mounting bolt to the liner outside the mill, a means to attach to the mounting bolt from outside of the mill, a means for pulling the mounting bolt through the liner and mill shell and a means for tensioning the mounting bolt.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A method for use in installation of a mill liner, the method including:
    a) retaining a mounting bolt at least partially within a liner opening extending through the mill liner;
    b) positioning the mill liner against a mill shell so that the retained mounting bolt is aligned with a mill shell opening extending through the mill shell;
    c) selectively coupling an extraction tool to the mounting bolt from outside the mill shell;
    d) detaching the mounting bolt from the liner using the extraction tool;
    e) pulling the mounting bolt through the mill shell opening using the extraction tool so that an end of the mounting bolt projects from the mill shell opening; and,
    f) securing a fastener onto the mounting bolt to thereby attach the mill liner to the mill.

2. The method according to claim 1, wherein retaining the mounting bolt at least partially within the liner opening includes the steps of:
    a) attaching the mounting bolt to a bolt housing; and,
    b) attaching the bolt housing to the mill liner.

3. The method according to claim 2, wherein the bolt housing is attached to the mill liner using at least one of:
    a) an adhesive;
    b) magnets; and,
    c) mechanical engagement with the mill liner.

4. The method according to claim 2 or claim 3, wherein the mounting bolt is attached to the bolt housing using at least one of:
    a) an adhesive;
    b) magnets;
    c) mechanical engagement with the bolt housing;
    d) a friction fit; and,
    e) an interference fit.

5. The method according to any one of claims 2 to 4, wherein at least part of the bolt housing is movably located within an outer housing and a biasing member is interposed between the bolt housing and the outer housing and is operable to urge the mounting bolt from a retracted position to an extended position, and wherein in the retracted position an end of the mounting bolt is fully contained within the liner opening and in the extended position the end of the mounting bolt extends at least partially from the liner opening.

6. The method according to any one of claims 2 to 4, wherein the bolt housing is a sacrificial member that remains attached to the liner after liner installation.

7. The method according to claim 6, wherein the sacrificial member is a cap that at least partially surrounds the head of the mounting bolt.

8. The method according to claim 7, wherein the cap is at least partially secured to the mounting bolt by a tie.

9. The method according to claim 1, wherein retaining the mounting bolt at least partially within the liner opening includes directly bonding the mounting bolt to the liner via an adhesive or foam.

10. The method according to claim 1, wherein retaining the mounting bolt at least partially within the liner opening includes the steps of:
   a) fastening a sacrificial clip to the head of the mounting bolt;
   b) positioning the mounting bolt into the liner opening; and,
   c) securing the sacrificial clip to the liner.

11. The method according to claim 10, wherein the sacrificial clip is secured to the liner by an adhesive.

12. The method according to claim 1, wherein retaining the mounting bolt at least partially within the liner opening includes the steps of:
   a) fastening a permanent clip to the head of the mounting bolt;
   b) attaching a holder assembly to the permanent clip;
   c) positioning the mounting bolt into the liner opening using the holder assembly;
   d) causing the permanent clip to expand against an internal surface of the liner opening; and,
   e) releasing the holder assembly from the clip.

13. The method according to claim 12, wherein the permanent clip is fastened to the mounting bolt by a fastener and the permanent clip is caused to expand against the internal surface of the liner opening by tightening the fastener.

14. The method according to any one of claims 1 to 13, wherein the method includes retaining the mounting bolt at least partially within the liner prior to transporting the liner into the mill.

15. The method according to any one of the preceding claims, wherein the extraction tool is coupled to the mounting bolt using at least one of:
   a) an adhesive;
   b) magnets;
   c) mechanical engagement with the mounting bolt;
   d) a friction fit;
   e) an interference fit; and,
   f) a screw fit.

16. The method according to claim 15, wherein a threaded socket is attached to the extraction tool for engagement onto a mating threaded protrusion on an end of the mounting bolt.

17. The method according to claim 15 or claim 16, wherein the method includes loading the fastener onto the extraction tool prior to coupling with the mounting bolt.

18. The method according to claim 17, wherein the method includes using the extraction tool to impart an axial load to the mounting bolt to at least one of:
   a) detach the mounting bolt from the liner; and,
   b) pull the mounting bolt through the mill shell opening.

19. The method according to claim 18, wherein the axial load is an impact load that is transmitted to the mounting bolt.

20. The method according to claim 19, wherein the extraction tool includes a reciprocating member that is manually moved back and forth over a shaft of the extraction tool and caused to impact a stop member to thereby generate the axial impact load.

21. The method according to claim 18, wherein the axial load is generated by actuating a hydraulic cylinder of the extraction tool.

22. The method according to claim 20 or claim 21, wherein the method includes releasing the fastener from the extraction tool and engaging it onto the mounting bolt while the extraction tool remains coupled to the mounting bolt.

23. The method according to claim 22, wherein the fastener includes a nut and the method includes threadingly engaging the nut onto a thread of the mounting bolt.

24. The method according to claim 22 or claim 23, wherein the method includes uncoupling the extraction tool from the mounting bolt once the fastener has been secured to the mounting bolt.

25. A mill liner installation system including:
   a) a mounting bolt;
   b) a retainer that retains the mounting bolt at least partially within a liner opening extending through the mill liner thereby allowing the mill liner to be positioned within the mill with the mounting bolt aligned with a mill shell opening extending through the mill shell;
   c) an extraction tool that in use is inserted through the mill shell opening from outside the mill shell, and selectively coupled to the mounting bolt, thereby allowing the mounting bolt to be detached from the retainer and pulled through the mill shell opening so that an end of the mounting bolt projects from the mill shell opening; and,
   d) a fastener that in use is attached to the mounting bolt to thereby attach the mill liner to the mill.

26. The mill liner installation system according to claim 25, wherein the retainer is at least one of:
   a) a bolt housing that is attached to the mill liner and the mounting bolt;
   b) a clip that is attached to the mounting bolt and mill liner; and,
   c) an adhesive or foam that retains the mounting bolt within the liner opening.

27. The mill liner installation system according to claim 26, wherein the bolt housing is attached to the mill liner using at least one of:
   a) an adhesive;
   b) magnets; and,
   c) mechanical engagement with the mill liner.

28. The mill liner installation system according to claim 26 or claim 27, wherein the mounting bolt is attached to the bolt housing using at least one of:
   a) an adhesive;
   b) magnets;
   c) mechanical engagement with the bolt housing;
   d) a friction fit; and,
   e) an interference fit.

29. The mill liner installation system according to any one of the claims 26 to 28, wherein at least part of the bolt housing is movably located within an outer housing and a biasing member is interposed between the bolt housing and the outer housing and is operable to urge the mounting bolt from a retracted position to an extended position, and wherein in the retracted position an end of the mounting bolt is fully contained within the liner opening and in the extended position the end of the mounting bolt extends at least partially from the liner opening.

30. The mill liner installation system according to any one of claims 26 to 29, wherein the bolt housing is a sacrificial member that remains attached to the liner after liner installation.

31. The mill liner installation system according to claim 30, wherein the sacrificial member is a cap that at least partially surrounds the head of the mounting bolt.

32. The mill liner installation system according to claim 31, wherein the cap is at least partially secured to the mounting bolt by a tie.

33. The mill liner installation system according to claim 26, wherein the clip is a sacrificial clip that is fastened to the head of the mounting bolt.

34. The mill liner installation system according to claim 33, wherein the sacrificial clip is secured to the liner by an adhesive.

35. The mill liner installation system according to claim 31, wherein the clip is a permanent clip that is fastened to the head of the mounting bolt.

36. The mill liner installation system according to claim 35, wherein the system further includes a holder assembly that is releasably attached to the permanent clip to allow the mounting bolt to be positioned into the liner opening.

37. The mill liner installation system according to claim 36, wherein the permanent clip is caused to expand against an internal surface of the liner opening to thereby retain the mounting bolt within the liner.

38. The mill liner installation system according to claim 37, wherein a tensioning tool is used to tighten a clip fastener to the head of the mounting bolt to thereby cause the permanent clip to expand in the liner opening.

39. The mill liner installation system according to any one of claims 25 to 38, wherein the extraction tool is coupled to the mounting bolt using at least one of:
  a) an adhesive;
  b) magnets;
  c) mechanical engagement with the mounting bolt;
  d) a friction fit;
  e) an interference fit; and,
  f) a screw fit.

40. The mill liner installation system according to claim 39, wherein a threaded socket is attached to the extraction tool for engagement onto a mating threaded protrusion on an end of the mounting bolt.

41. The mill liner installation system according to any one of claims 25 to 40, wherein the extraction tool includes a biasing mechanism to urge the mounting bolt through the mill shell opening.

42. The mill liner installation system according to any one of claims 25 to 41, wherein the extraction tool includes:
  a) a shaft, the shaft having:
    i) a connector that attaches to the mounting bolt in use; and,
    ii) a stop member radially projecting from the shaft;
  b) a reciprocating member that is manually moved back and forth over the shaft and caused to impact the stop member to thereby generate an axial impact load for detaching the mounting bolt from the liner and urging the mounting bolt through the mill shell opening.

43. The mill liner installation system according to any one of claims 25 to 41, wherein the extraction tool includes:
  a) a body;
  b) a shaft movably mounted within the body, the shaft having a connector that attaches to the mounting bolt in use; and,
  c) a piston coupled to the shaft, to move the shaft relative to the body and thereby pull the mounting bolt through the mill shell opening.

44. The mill liner installation system according to any one of claims 25 to 43, wherein the fastener includes a nut that threadingly engages a thread on the mounting bolt.

45. The mill liner installation system according to any one of claims 25 to 44, wherein the fastener is mounted on the extraction tool, allowing the fastener to engage the mounting bolt while the extraction tool is coupled to the mounting bolt.

46. A mill liner installation method including:
  a) prior to installing the mill liner, retaining the mounting bolt so that the mounting bolt is positioned at least partially within a liner opening extending through the mill liner;
  b) mounting the mill liner within the mill with the mounting bolt positioned within the liner opening;
  c) inserting an extraction tool through a mill opening in the mill;
  d) selectively coupling the extraction tool to the mounting bolt;
  e) detaching the mounting bolt from the liner;
  f) pulling the mounting bolt through the mill opening so that an end of the mounting bolt projects from the mill opening; and,
  g) attaching a fastener to the mounting bolt to thereby attach the mill liner to the mill.

* * * * *